United States Patent [19]

Pavur

[11] Patent Number: 4,809,872
[45] Date of Patent: Mar. 7, 1989

[54] SEALING PLUG AND INSTALLATION TOOL THEREFORE

[75] Inventor: Carol P. Pavur, Warren, Mich.

[73] Assignee: Chrysler Motors Corporation, Highland Park, Mich.

[21] Appl. No.: 190,322

[22] Filed: May 5, 1988

[51] Int. Cl.[4] ............................................. B65D 39/00
[52] U.S. Cl. .......................... 220/307; 220/DIG. 19; 220/284
[58] Field of Search ................ 220/307, DIG. 19, 284

[56] References Cited

U.S. PATENT DOCUMENTS

| | | |
|---|---|---|
| 4,334,632 | 6/1982 | Watanabe ............................ 220/307 |
| 4,399,927 | 8/1983 | Yaotani . |
| 4,413,748 | 11/1983 | Kessler et al. ....................... 220/281 |
| 4,487,998 | 12/1984 | Pegram . |
| 4,640,434 | 2/1987 | Johnsen . |
| 4,646,932 | 3/1987 | Masher ............................... 220/307 |

*Primary Examiner*—George T. Hall
*Attorney, Agent, or Firm*—Edward P. Barthel

[57] ABSTRACT

A one-piece resilient plug having an elongated body comprising a head, formed with an axially extending sealing lip, and a shank separated from the head by a continuous locking groove. The plug shank includes a frusto-conical surface intermediate a shoulder area and a pair of interconnected cap portions at its free end. A pair of elongated sockets symmetrically disposed adjacent either end of a central reverse cavity are provided with their openings in the head and their closed ends each defined by an elongated cap portion. A hand installation tool includes a bifurcated configured blade providing a pair of blade prongs adapted to be received in the sockets. Upon axial force being exerted by the tool on the cap portions the blade prongs deform the plug such that the shank is effectively drawn through a conforming vehicle body panel elongated slot-shaped aperture with the plug groove sealingly locked to the panel aperture upon removal of the tool.

3 Claims, 2 Drawing Sheets

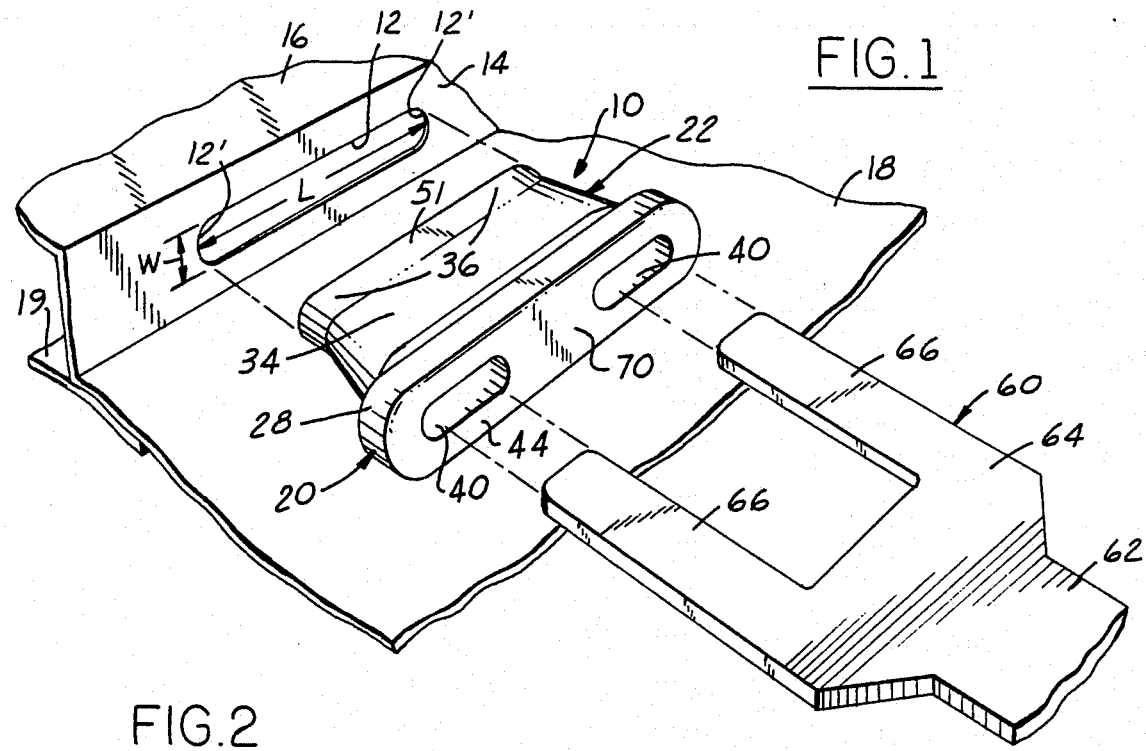
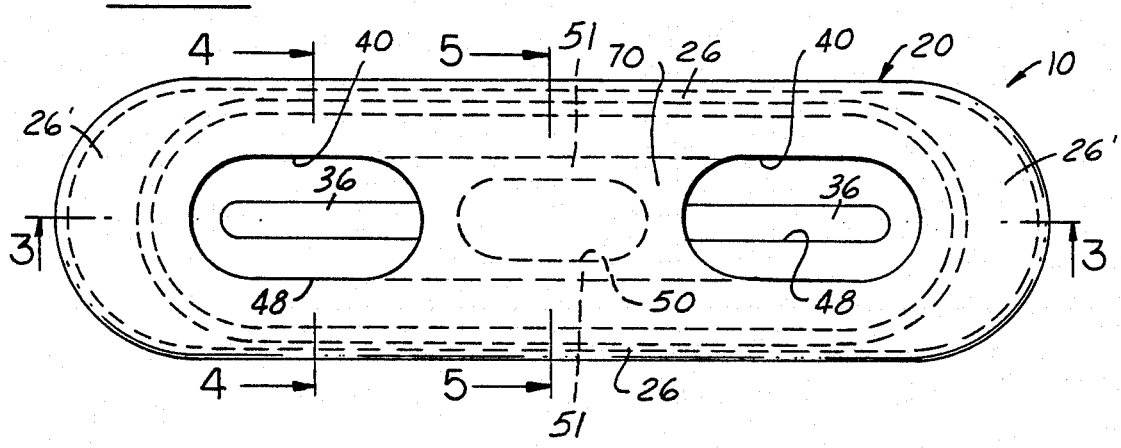
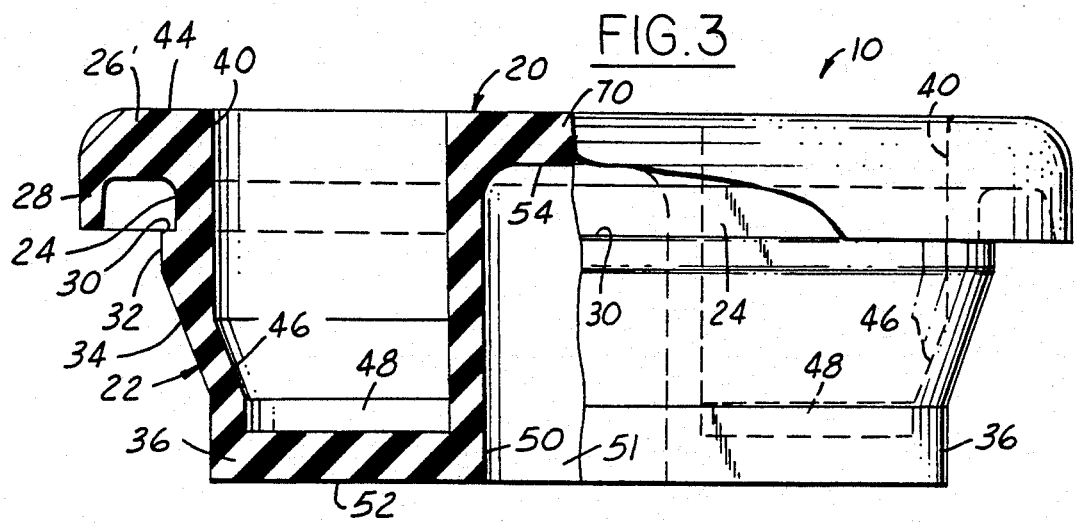

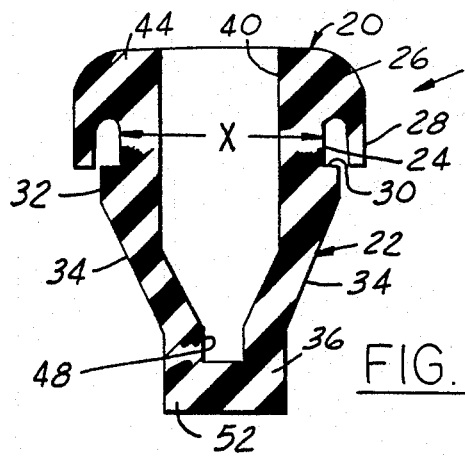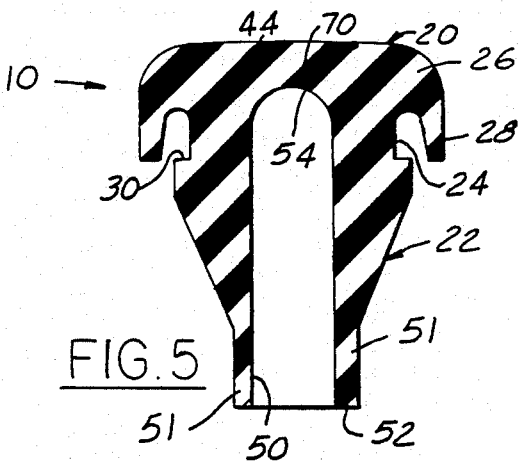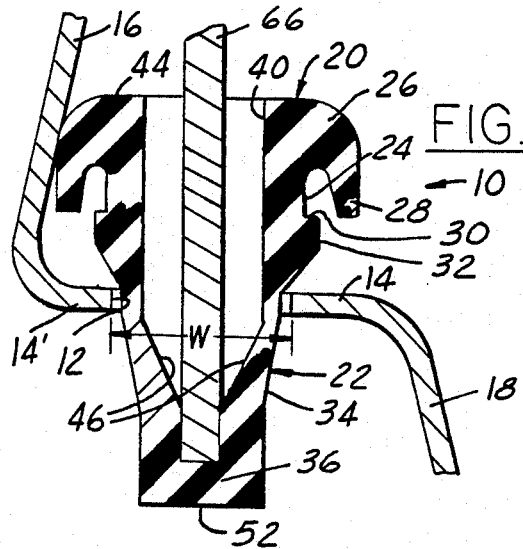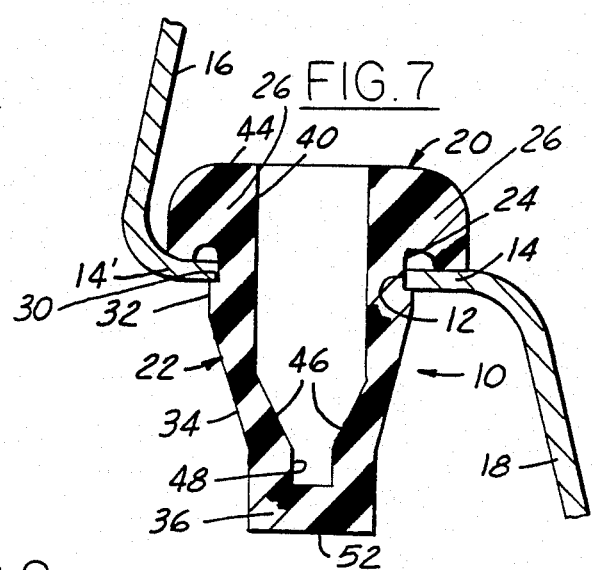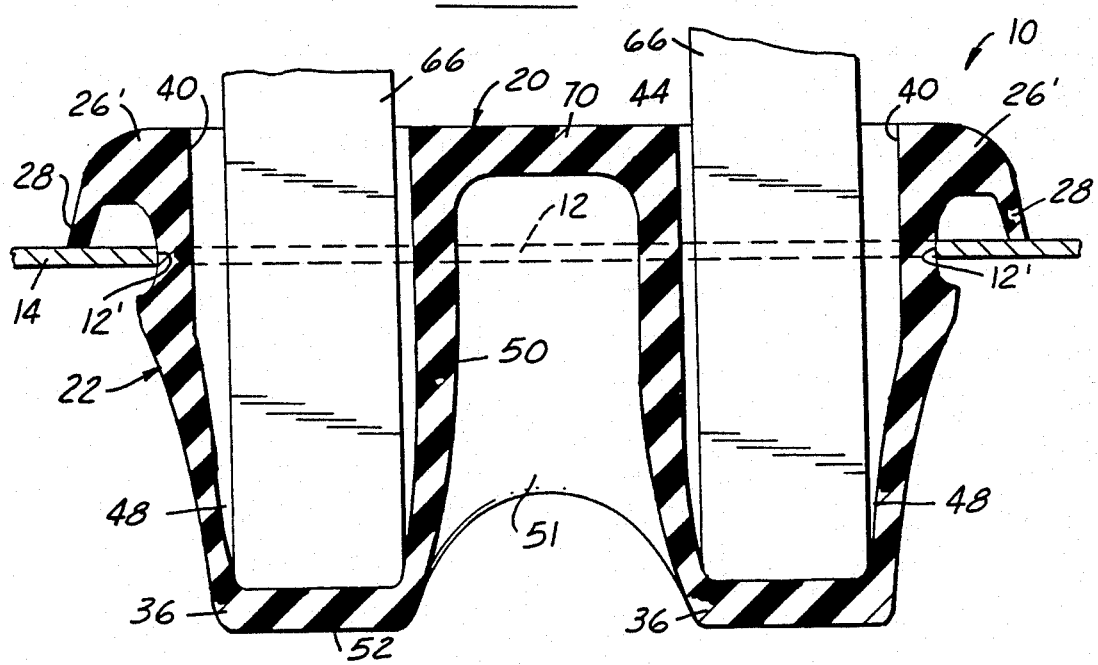

SEALING PLUG AND INSTALLATION TOOL THEREFORE

BACKGROUND OF THE INVENTION

This invention relates to an elastomeric sealing plug for a vehicle body and more particularly to an elongated slot-shaped sealing plug adapted for ready assembly in a conforming opening in a vehicle body panel by means of a cooperating hand installation tool.

The prior art is replete with various sealing plug arrangements. The U.S. Pat. No. 4,399,927, issued Aug. 23, 1983 to Yaotani et al., for example, discloses a snap-on plug. In one form of the Yaotani patent a socket wrench is used to insert a plug into a complementary circular aperture by applying a force first on a higher part of a shoulder and then on a lower part of the same.

The U. S. Pat. No. 4,487,998 issued Dec. 11, 1984 to Pegram discloses a plug-like releasable grommet formed of resilient material. The Pegram grommet has a laterally extending mounting flange axially spaced form a laterally extending detent shoulder for securing the grommet in a panel aperture received between the mounting flange and detent shoulder. An axially extending socket adjacent the detent shoulder is provided for receipt of a lever-form release tool such as a screwdriver between a cable anchored by the grommet and the detent shoulder facilitating ready release from the panel.

The U.S. Pat. No. 4,640,434 issued Feb. 3, 1987 to Johnson et al. discloses a plug for sealing holes. The Johnson patented plug has an elastomeric tapered body member of circular or rectangular cross-section, formed of a plurality of integral tapered portions of successively reduced taper.

SUMMARY OF THE INVENTION

It is an object of the present invention to provide a resilient one-piece plug for sealing an elongated slot-shaped aperture in a vehicle panel in a ready manner by means of a hand installation tool.

It is another object of the present invention to provide a sealing plug as set forth above wherein a pair of symmetrically disposed sockets are formed adjacent either end of the plug body for reception of a hand installation bifurcated configured tool defining a pair of blade prongs wherein each blade prong is adapted for reception in an associated socket allowing parallel axially directed forces to be applied resulting in ready assembly of the plug in the panel aperture.

It is still another object of the present invention to provide a sealing plug as set forth above wherein a central reversed cavity between the sockets provides plug flexibility during installation while a retained central head portion of the plug body functions to resist lateral inward movement of the plug side flange portions thereby securely retaining the plug in the panel elongated slot-shaped aperture.

It is yet another object of the present invention to provide a resilient sealing plug as set forth above wherein the plug is adapted, in one instance, for an elongated slot-shaped fluid drainage aperture in a narrow ledge portion bent into the panel having at least one marginal side panel portion. The pair of sockets are symmetrically disposed adjacent either end of the central reverse cavity with their openings in the head and their closed ends each formed by an elongated cap portion. The tool blade prongs are inserted in the pair of sockets and application of an axial force on the cap portions deform the plug effectively drawing the plug shank through the conforming slot-shaped aperture. A mounting flange extends around the plug head comprising linear flange side portions and arcuate flange end portions. The end flange portions extend outwardly a predetermined longitudinal distance greater than the transverse outward extent of the flange side portions thereby assisting in retaining the plug in narrow ledge installations.

These and other objects and advantages of the present invention will be readily apparent by reference to the following description of the preferred embodiment and appended drawings.

BRIEF DESCRIPTION OF THE DRAWINGS

FIG. 1 is a perspective view of a portion of a vehicle body panel showing a plug of the present invention being installed in an elongated panel opening by means of a hand installation tool;

FIG. 2 is a top elevational view of the plug of FIG. 1;

FIG. 3 is an vertical sectional view, partly in elevation, taken substantially on the line 3—3 of FIG. 2;

FIG. 4 is a vertical transverse sectional view taken on the line 4—4 of FIG. 2;

FIG. 5 is a vertical transverse sectional view taken on the line 5—5 of FIG. 3;

FIG. 6 is a fragmentary transverse sectional view similar to FIG. 4 showing the plug in a state partly inserted into a complementary elongated slot-shaped aperture of the flange wall by using the installation tool;

FIG. 7 is a view similar to FIG. 6 showing the plug in its fully inserted state; and FIG. 8 is a fragmentary longitudinal sectional view showing the plug in a partly inserted state intermediate the states of FIG. 6 and FIG. 7.

DETAILED DESCRIPTION OF THE INVENTION

Referring now to the drawings and particularly to FIGS. 1 and 2 wherein an integral one-piece sealing plug is indicated generally at 10. The plug is molded from an elastomeric or rubber-like flexible material and is adapted to be mounted in a bulkhead or panel of a vehicle body or the like to seal an elongated slot-shaped aperture. In the disclosed embodiment the plug 10 is designed to be inserted during an automobile assembly line operation in an elongated slot-shaped fluid drainage aperture 12 formed in a narrow horizontally disposed ledge portion 14 bent into a body panel including an upper panel section 16 and a lower panel section 18.

In the installation shown in FIG. 1 an interior backing panel 19 is fixed as by welding to the lower panel section 18 creating an area wherein a fluid, such as a corrosion preventative paint, is trapped. Thus, the slot-shaped aperture 12 permits drainage of the trapped paint during a body dipping process requiring a later installed sealing plug. The slot-shaped aperture has parallel side edges terminating in a half-round radiused ends 12'. In the disclosed embodiment the opening has an overall length "L" of about 32 mm and a width "W" of about 6.5 mm such that the length "L" is about five times greater than the width "W".

It will be seen in FIGS. 6 and 7 that in the disclosed arrangement the panel ledge portion 14 is generally horizontally disposed with the plug 10 being inserted in the elongated slot-shaped aperture 12 vertically downwardly from above. In the assembly line installation of FIG. 1, however, it may be necessary to insert the plug vertically upwardly from below. In the FIG. 1 installation the opening 12 is located in a "blind" area wherein a worker is unable to readily view the hidden elongated slot-shaped aperture 12 during the installation of the plug 10 from below.

As best seen in FIGS. 2 and 3 the plug 10 is in the form of an elongated narrow width body member having an upper head 20 and an lower shank 22 separated by a peripheral continuous locking groove 24. The terms "upper" and "lower" or the like are used only for purposes of description and could be interchanged in accordance with the comments in the preceding paragraph.

The locking groove 24 is defined in part at its lower side by a continuous radially outwardly extending peripheral head flange defined by parallel side portions 26 and arcuate end portions 26', terminating in a continuous sealing lip portion 28 projecting axially downwardly with the plug in its unassembled or free state. The groove 24 is defined at its upper terminus by an upwardly facing peripheral shoulder edge 30 defined by outer uniform cross-section shoulder surface area 32 of the plug shank 22.

The plug shank 22 has a frusto-conical shaped intermediate converging area defined by tapered side surface 34 converging from the outer shoulder surface 32 to a pair of lower end cap portions 36 each designed with a uniform horizontal cross-section. The cap portions 36 are located on either side of a control reverse blind cavity 50 defined in part by thin side web portions 51 of the shank interconnecting the cap portions 36. It will be noted in FIG. 4 that the resilient plug body 10 is symmetrically formed about its longitudinal and transverse vertical planes of symmetry indicated by section lines 5—5 and 3—3 respectively, in FIG. 2.

With reference to FIGS. 2 and 3 it will be seen that the plug body 10 is formed with a pair of elongated sockets 40 of a size and shape disposed on either side of the transverse plane of symmetry. That is, the major axes of both the end sockets 40 are aligned in the longitudinal plane of symmetry. It will be observed that the sockets 40 each have their opening in top surface 44 of the plug head 20 and their closed or blind end terminating in converging internal surface 46 defining a narrow longitudinally extending slot 48. The slots 48 are sized and shaped to receive a hand installation tool to be described.

The plug body is further molded with a central elongated reverse blind cavity or pocket 50 located intermediate the pair of sockets 42 and bisected by the transverse plane of section line 5—5. The reverse cavity 50 is formed with its opening located in end surface 52 intermediate the end cap portions 36 and its upper blind or closed end 54 terminating in the plug head 20.

A hand installation tool, shown in FIG. 1 at 60, comprises a handle portion 62 and a bifurcated configured plate-like blade 64 in the form of a pair of identical elongated parallel blade prongs 66. The parallel co-planar blade prongs 66 are sized and spaced for simultaneous reception in an associated one of the sockets 40. It will be noted that the prong free ends are sized for snug engagement in an associated one of the narrow slots 48 at the closed end of each socket 40. With reference to FIGS. 7 and 8 it will be seen that the peripheral flange is formed such that its arcuate flange end portions 26' extend outwardly a predetermined larger distance at each longitudinal end of the plug head than the flange side portions 26. The extended arcuate flange end portions 26' insure positive surface contact of each plug head end 26' adjacent its associated elongated opening radiused ends 12. This arrangement partially compensates for the minimal contact area provided for the side flange portion 26 with its associated narrow flange wall portion 14', shown in FIGS. 6 and 7, along one side of the opening 12 adjacent the panel section 16.

With reference to FIG. 8 it will be appreciated that the hand tool prongs 66 function to stretch each of their associated sockets 40 in the axial direction of the applied tool force acting on respective shank cap portions 36. As a result of the prong force in conjunction with the shank tapered area 34 there is a lateral narrowing of the plug body transverse and longitudinal dimensions at the shoulder area surface 32. In this way the peripheral locking groove 24 is brought into uniform engagement with the edge of conforming elongated slot-shaped opening 12. It will be noted that by virtue of the prong-force being applied to each of the cap portions 36 the plug shank 22 is effectively pulled or drawn through the elongated slot-shaped aperture 12 as opposed to trying to push the plug shank into the aperture 12 by applying a force at its head surface 44. Further, the bifurcated hand tool applies an installation force without damaging the plug.

It will be appreciated that the central reversed blind cavity 50 provides a void assisting in the lateral shrinkage of the plug body shoulder area 32 during installation. In this regard a central head portion is retained at 70, which inhibits lateral or transverse compression of the plug flange side portions 26. Thus, the central head portion 70 prevents the narrower flange side portions 26 from being readily collapsed inwardly and allowing the plug head to be dislodged and pushed through the slot-shaped aperture 12. That is, without the central reverse cavity 50 the elongated shape of the plug 10 would result in the parallel flange side portions 26 being brought into contact and unlocking the plug groove 24.

It will be noted in FIG. 6 that the width "W" of the elongated slot-shaped aperture 12 is a predetermined distance slightly less than the width of the locking groove 24, indicated by dimension "X". This insures that the plug locking groove 24 is in tight sealed contact with the aperture 12. In the disclosed form the dimension "X" is about 8.0 mm while the dimension "W" as stated above is about 6.5 mm.

Although the preferred embodiment of the invention has been illustrated and described in detail, it will be understood that various changes and modifications may be made in the disclosed embodiment without departing from the scope and spirit of the invention as defined in the appended claims.

What is claimed is:

1. An elastomeric one-piece plug for sealing an elongated slot-shaped aperture extending through a vehicle body panel or the like having opposed first and second surfaces, said plug comprising:

an elongated plug body having a head and a shank separated by a peripheral locking groove, said groove defined at its one terminus by a shoulder transversely disposed face portion of said shank and at its other terminus by a mounting flange extending around said head, said mounting flange comprising linear flange side portions and arcuate flange end portions, said mounting flange terminating in a lip portion projecting axially toward said shank with said plug in its free state, said plug shank having a frusto-conical shaped portion with a converging tapered surface located intermediate said shoulder portion and a pair of free end cap portions, said plug body formed symmetrical about longitudinal and transverse vertical planes of symmetry with a pair of elongated blind sockets disposed on either side of said transverse plane, said elongated sockets oriented with their principal axes aligned in said longitudinal plane, each said socket having its opening in said plug head and its closed end terminating in an associated shank cap portion, said plug body formed with a central elongated blind cavity intermediate said pair of sockets with said central cavity having its principal axis aligned in said longitudinal plane, said blind cavity closed by a central head portion intermediate said socket openings, said blind cavity defined in part by thin side web portions of said shank interconnecting said cap portions, a hand installation tool in the form of a bifurcated configured plate-like blade defining a pair of parallel blade prongs, each said blade prong of a size and shape for reception in an associated one of said sockets, wherein upon axial force being exerted by the tool on said interconnected cap portions causing said blade prongs to thereby deform said plug body so as to draw said plug shank through said opening readily securing said plug locking groove in sealing contact with said aperture, whereby said resilient lip portion flexed into continuous sealing contact with said panel first surface and said shoulder horizontal face in biased contact with said panel second surface, and said central head portion resisting inward movement of said plug flange side portions thereby obviating easy removal of said plug.

2. The one-piece plug as set forth in claim 1, wherein said elongated slot-shaped aperture located in a ledge portion formed in said panel, said aperture having parallel side edges and half-round radiused end edges such that its overall length is of the order of five times its width, said plug mounting flange being formed such said arcuate end flange portions extend outwardly at each end of said plug head a predetermined longitudinal extent at least two times the transverse outward extent of said flange side portions.

3. The one-piece plug as set forth in claim 1, wherein each said socket closed end formed with a narrow slot aligned in said longitudinal plane, wherein each said blade prong free end adapted for snug reception in an associated one of said socket slots.

* * * * *